INVENTOR
Ralph Karsten
by McDougall, Hersh, Scott
and Ladd
Att'ys

United States Patent Office 3,458,340
Patented July 29, 1969

3,458,340
METHOD FOR PRINTING ON FOAMED POLYSTYRENE WITH CELLULOSE ETHER PRINTING COMPOSITION
Ralph Karsten, Chicago, Ill., assignor to Screen-Flock Industries, Inc., Chicago, Ill., a corporation of Illinois
Filed Sept. 22, 1966, Ser. No. 581,278
Int. Cl. B41m 1/10; B44d 1/40
U.S. Cl. 117—38       3 Claims

ABSTRACT OF THE DISCLOSURE

A method for printing on foamed polystyrene in which the portions to be printed are wet on the surface with a solution formulated of an organic solvent in which both polystyrene and cellulose ethers are soluble, a cellulose ether dissolved in the solvent in an amount within the range of 1 part by weight cellulose ether to 1–10 parts by weight solvent and a tinctorial agent in the form of a dye or pigment.

---

This invention relates to the production of an etched image on foamed polystyrene surfaces and it relates more particularly to the method and means for producing attractive, visible, intaglio images on panels of foamed polystyrene whereby an attractive display or advertising piece is produced.

It is an object of this invention to provide a method and means for imaging foamed polystyrene by an etch formed into the surface of the polystyrene foam and in which an image of good color intensity can be secured, in which an image of good definition is formed, in which a permanent and attractive imaged panel is produced, which can be imaged by screen printing, and in which a display panel of good feel, high strength, good flexibility, lightness in weight, and good body can be provided with printing material attractively pressed on the surfaces thereof for use of the assembly in outdoor or indoor displays without deterioration, wetting, or aging.

These and other objects and advantages of this invention will hereinafter appear, and, for purposes of illustration, but not of limitation, an embodiment of the invention is shown in the accompanying drawing in which.

Figure 1:
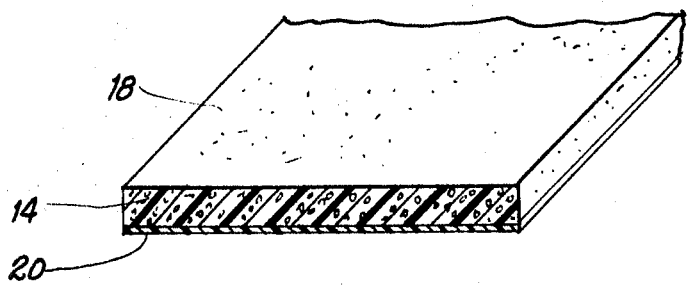
FIG. 1 is a perspective view, partially in section, of a panel which may be employed in the practice of this invention.
Figure 2:
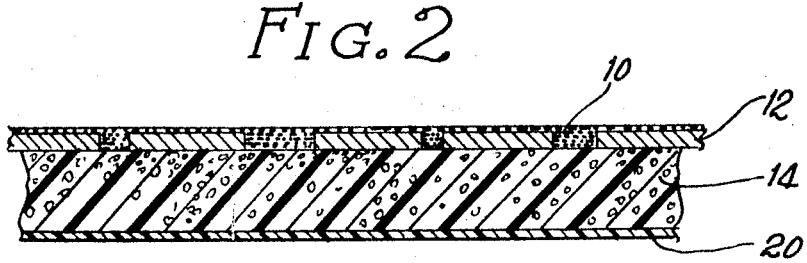
FIG. 2 is a sectional elevational view showing a step in silk screening of the panel of FIG. 1.
Figure 3:
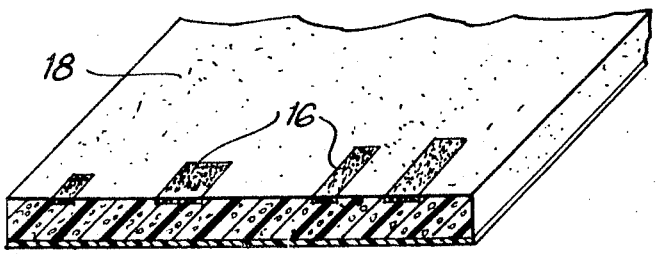
FIG. 3 is a perspective view, partially in section, of the printed panel.

The concepts of this invention reside in the application of a composition to form a visible image on the surface of a panel of foamed polystyrene wherein the imaging composition comprises a fluid composition formulated to contain a tinctorial or coloring agent in a vehicle which etches the portions of the polystyrene foam on which the imaging composition is applied to produce an engraved image having a colored base formed intaglio in the surface of the foamed polystyrene.

A number of problems have been encountered in achieving the desired engraved image in the surface of the polystyrene foam. Many of the solvent systems containing tinctorial agents continue to dissolve the polystyrene foam whereby the applied imaging material creeps into adjacent portions for spread of the image whereby a poor and unattractive image is formed in the surface of the foamed polystyrene. Many of the compositions applied to the surface of the foamed polystyrene layer become set substantially immediately whereby a surface print is secured which is often times characterized by poor adhesion to the underlying surface with corresponding loss of all or part of the image.

Many of the resinous materials formulated into treating compositions of the type described are incompatible with the polystyrene or else film over the polystyrene layer with the result that insufficient anchorage is established or else an unattractive image is secured.

It has been found that a clear and distinct image can be formed intaglio into the surface of the foamed polystyrene to carve out a colored image which is strongly and permanently bonded in a manner to form an integral part of the panel when the imaging material applied to the surface of the foamed polystyrene, as by silk screen printing or other printing method, is formulated of the combination of ethyl cellulose dissolved in a high boiling solvent for polystyrene to form a fluid vehicle in which the tinctorial agent is incorporated in the desired amount for color intensity.

As the solvent component, it is preferred to make use of xylol but other related high boiling aromatic solvents, such as benzene, naphthol, toluol, unsubstituted or substituted with halogen, can be employed, or esters or ketones such as methyl ethyl ketone, amyl acetate and the like, preferably in combination with one or more of the described aromatic solvents. The desired engraving effect is secured, without spread of the image, when the ethyl cellulose is present in the imaging or printing composition in an amount within the range of one part by weight ethyl cellulose to 1 to 10 parts by weight of the solvent and preferably in the range of one part by weight ethyl cellulose to 2 to 5 parts by weight of the solvent.

While best results have been secured with ethyl cellulose dissolved in the desired concentration in the vehicle, other cellulose ethers may be employed such as methyl cellulose, carboxymethyl cellulose and the like.

The tinctorial agent can be embodied into the printing composition in the form a a dyestuff or a pigment in which the latter may be formed of a dyestuff in a resinous carrier ground to fine particle size or of an inorganic pigment. The dyestuffs may be in the form of a natural organic color such as indigo, logwood, or the like, or a synthesized organic pigment such as an azo dye of the type para-red, permanent orange, hansa yello, or a basic dye such as malachite green, rhodamine blue, or a toner such as a blue toner formed of victoria blue, green toner formed of brilliant green, red toner formed of rhodamine dyes, or violet toner, such as described in the book entitled "The Chemistry or Physics of Organic Pigments," published by John Wiley & Sons, Inc. of London, England (pages 170–172). The inorganic pigments may be represented by carbon black or any of the metal oxides or salts, such as antimony oxide, iron oxide, lead chromite, and the like.

The amount of tinctorial agent required to give the desired intensity of the image will depend somewhat upon the type of tinctorial agent. For example, with a dyestuff, the amount required for the desired color intensity will be considerably less than that required to achieve equivalent color with a pigment. When the tinctorial agent is in the form of the dyestuff, an amount within the range of .2 to 5 percent by weight of the treating composition is sufficient, while from .5 to 10 percent by weight of a pigment will be desired.

The following examples are given by way of illustration, but not by way of limitation, of the practice of this invention:

Example 1

Printing ink composition:

| | Parts by weight |
|---|---|
| Methyl cellulose (25% solution in alcohol) | 25 |
| Xylol | 200 |
| Red toner | 14 |

Example 2

| | |
|---|---|
| Ethyl cellulose (25% by weight solution) | 20 |
| Xylol | 100 |
| Carbon black | 10 |
| Methyl ethyl ketone | 50 |

Example 3

| | |
|---|---|
| Methyl cellulose | 25 |
| Xylol | 100 |
| Malachite green | .5 |

The fluid composition 10 is applied through a silk screen 12 onto the surface of a panel 14 of foamed polystyrene having a thickness of from ⅛ inch to ¼ inch to deposit the imaging material on the portions of the surface corresponding to the stencil openings. In a short time, the imaging composition eats into the underlying surface to carve out the image 16 which retains the intense color of the tinctorial agent as a broken lining in the intaglio print to cause the image to stand out clearly against the white background 18.

The image is carved a short distance into the surface directly underlying the area on which the imaging material is deposited, without lateral spread. Because of the high compatibility of the imaging material with the polystyrene base of the foamed panel, the colored image becomes integrated to form a permanent part of the panel and thereby to provide a permanent image intaglio in the surface.

As the panel of foamed polystyrene, it is preferred to make use of a soft, flexible, thin panel of foamed polystyrene such as is marketed by Sekisui Plastic Corporation, 369 Lexington Ave., New York, N.Y.

In order to provide the strength and integrity desired for use of the panel as a poster or in advertisement or as a structural material for indoor or outdoor use, it is desirable to back the panel or to sandwich the panel with a thin sheet 20 or film of a polyolefin resin, such as described in my copending application filed concurrently herewith and entitled "Panels of Polyolefin Film and Foamed Polystyrene and Method."

It will be apparent that I have provided a new and improved composition and method for printing on foamed polystyrene wherein a permanent and attractive printed panel can be produced.

It will be understood that changes may be made in the details of formulation and application without departing from the spirit of the invention, especially as defined in the following claims.

I claim:
1. The method of printing on surfaces of foamed polystyrene comprising the steps of wetting the surface of the foamed polystyrene in the portions to be imaged with a solution formulated to contain a tinctorial agent selected from the group consisting of a dye and a pigment, an organic solvent selected from the group consisting of unsubstituted and halogen substituted xylol, benzene, naphthol and toluol, methyl ether ketone, amyl acetate and mixtures thereof and a cellulose derivative selected from the group consisting of ethyl cellulose and methyl cellulose which is soluble in the solvent and present in an amount within the range of one part by weight of cellulose derivative to 1 to 10 parts by weight of the solvent whereby the imaging material carves the image into the surface of the polystyrene with the tinctorial agent bonded as a lining on the carved out portions.

2. The method of printing on foamed polystyrene as claimed in claim 1 in which the cellulose derivative is present in the imaging composition in an amount within the range of one part by weight of the cellulose ether to 2 to 5 parts by weight of the organic solvent.

3. The method of printing on foamed polystyrene as claimed in claim 1 in which the tinctorial agent is present in the imaging composition in an amount within the range of .2 to 5 percent by weight, when formed of a dyestuff, and .5 to 10 percent by weight, when formed of a pigment.

References Cited

UNITED STATES PATENTS 2,162,027   6/1939   Muskat _____ 106—191

OTHER REFERENCES

Ellis: "Printing Inks," Reinhold Publishing Co., 1940, page 283.

Ott et al.: "High Polymers," vol. V ("Cellulose and Cellulose Derivatives"), Part II, 1954, page 906.

Boundy-Boyer: "Styrene Its Polymers, Copolymers and Derivatives," Monograph Series No. 115, 1952, pages 426 and 427.

ALLAN LIEBERMAN, Primary Examiner

106—20, 22, 23, 183, 187, 190, 191, 193; 117—8, 12, 138.8, 166